(12) United States Patent
Van Orden et al.

(10) Patent No.: US 10,037,773 B2
(45) Date of Patent: Jul. 31, 2018

(54) HEAT ASSISTED MAGNETIC RECORDING WRITER HAVING INTEGRATED POLARIZATION ROTATION WAVEGUIDES

(71) Applicant: WESTERN DIGITAL (FREMONT), LLC, Fremont, CA (US)

(72) Inventors: Derek A. Van Orden, San Francisco, CA (US); Sergei Sochava, Sunnyvale, CA (US); Jianwei Mu, Pleasanton, CA (US); Ge Yi, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/587,571

(22) Filed: May 5, 2017

(65) Prior Publication Data

US 2017/0243608 A1    Aug. 24, 2017

Related U.S. Application Data

(63) Continuation of application No. 14/752,482, filed on Jun. 26, 2015, now Pat. No. 9,646,639.

(51) Int. Cl.
*G11B 5/48* (2006.01)
*G11B 5/31* (2006.01)
(Continued)

(52) U.S. Cl.
CPC ...... *G11B 5/4866* (2013.01); *B29D 11/00644* (2013.01); *G02B 6/125* (2013.01);
(Continued)

(58) Field of Classification Search
CPC ........ G02B 6/1228; G02B 6/14; G02B 6/125; G02B 6/126; G02B 6/13; G02B 27/281;
(Continued)

(56) References Cited

U.S. PATENT DOCUMENTS 6,011,641 A    1/2000   Shin et al.
6,016,290 A    1/2000   Chen et al.
(Continued)

OTHER PUBLICATIONS

D. Dai and J. Bowers. "Novel concept for ultracompact polarization splitter-rotator based on silicon nanowires," Optics Express, vol. 19, No. 11, 2011.
(Continued)

*Primary Examiner* — Dionne H Pendleton
(74) *Attorney, Agent, or Firm* — Foley & Lardner LLP (57) ABSTRACT

A heat assisted magnetic recording (HAMR) writer is described. The HAMR writer is coupled with a laser that provides energy having a first polarization state. The HAMR writer has an air-bearing surface (ABS) configured to reside in proximity to a media during use, a plurality of waveguides, a main pole and at least one coil. The main pole writes to the media and is energized by the coil(s). The waveguides receive the energy from the laser and direct the energy toward the ABS. The waveguides include an input waveguide and an output waveguide. The input waveguide is configured to carry light having the first polarization state. The output waveguide is configured to carry light having a second polarization state different from the first polarization state. The waveguides are optically coupled and configured to transfer the energy from the first polarization state to the second polarization state.

16 Claims, 9 Drawing Sheets

(51) Int. Cl.

| | | |
|---|---|---|
| *G02B 6/125* | (2006.01) | |
| *G02B 6/126* | (2006.01) | |
| *G02B 6/14* | (2006.01) | |
| *G11B 5/60* | (2006.01) | |
| *G02F 1/01* | (2006.01) | |
| *B29D 11/00* | (2006.01) | |
| *G11B 5/00* | (2006.01) | |

(52) U.S. Cl.
CPC ............... *G02B 6/126* (2013.01); *G02B 6/14* (2013.01); *G02F 1/011* (2013.01); *G11B 5/314* (2013.01); *G11B 5/6088* (2013.01); *G11B 2005/0021* (2013.01)

(58) Field of Classification Search
CPC ...... G02B 6/105; G02B 6/136; G02B 6/2766; G02B 6/30; G11B 2005/0021; G11B 2005/0024; G11B 5/17; G11B 5/4866; G11B 5/6082; G11B 5/6088; G11B 5/314; G11B 5/105; G11B 5/3163; B29D 11/00644; G02F 1/011
See application file for complete search history.

(56) References Cited

U.S. PATENT DOCUMENTS

| | | | |
|---|---|---|---|
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,055,138 A | 4/2000 | Shi | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,190,764 B1 | 2/2001 | Shi et al. | |
| 6,193,584 B1 | 2/2001 | Rudy et al. | |
| 6,195,229 B1 | 2/2001 | Shen et al. | |
| 6,198,608 B1 | 3/2001 | Hong et al. | |
| 6,198,609 B1 | 3/2001 | Barr et al. | |
| 6,201,673 B1 | 3/2001 | Rottmayer et al. | |
| 6,212,153 B1 | 4/2001 | Chen et al. | |
| 6,215,625 B1 | 4/2001 | Carlson | |
| 6,219,205 B1 | 4/2001 | Yuan et al. | |
| 6,233,116 B1 | 5/2001 | Chen et al. | |
| 6,304,414 B1 | 10/2001 | Crue et al. | |
| 6,389,499 B1 | 5/2002 | Frank et al. | |
| 6,392,850 B1 | 5/2002 | Tong et al. | |
| 6,399,179 B1 | 6/2002 | Hanrahan et al. | |
| 6,404,600 B1 | 6/2002 | Hawwa et al. | |
| 6,404,706 B1 | 6/2002 | Stovall et al. | |
| 6,410,170 B1 | 6/2002 | Chen et al. | |
| 6,411,522 B1 | 6/2002 | Frank et al. | |
| 6,417,998 B1 | 7/2002 | Crue et al. | |
| 6,417,999 B1 | 7/2002 | Knapp et al. | |
| 6,418,000 B1 | 7/2002 | Gibbons et al. | |
| 6,418,048 B1 | 7/2002 | Sin et al. | |
| 6,421,211 B1 | 7/2002 | Hawwa et al. | |
| 6,421,212 B1 | 7/2002 | Gibbons et al. | |
| 6,424,505 B1 | 7/2002 | Lam et al. | |
| 6,424,507 B1 | 7/2002 | Lederman et al. | |
| 6,430,806 B1 | 8/2002 | Chen et al. | |
| 6,433,965 B1 | 8/2002 | Gopinathan et al. | |
| 6,433,968 B1 | 8/2002 | Shi et al. | |
| 6,433,970 B1 | 8/2002 | Knapp et al. | |
| 6,437,945 B1 | 8/2002 | Hawwa et al. | |
| 6,445,536 B1 | 9/2002 | Rudy et al. | |
| 6,445,542 B1 | 9/2002 | Levi et al. | |
| 6,445,553 B2 | 9/2002 | Barr et al. | |
| 6,445,554 B1 | 9/2002 | Dong et al. | |
| 6,504,676 B1 | 1/2003 | Hiner et al. | |
| 6,611,398 B1 | 8/2003 | Rumpler et al. | |
| 6,700,738 B1 | 3/2004 | Sin et al. | |
| 6,760,196 B1 | 7/2004 | Niu et al. | |
| 6,801,411 B1 | 10/2004 | Lederman et al. | |
| 6,884,148 B1 | 4/2005 | Dovek et al. | |
| 6,912,106 B1 | 6/2005 | Chen et al. | |
| 6,947,258 B1 | 9/2005 | Li | |
| 6,961,221 B1 | 11/2005 | Niu et al. | |
| 6,989,972 B1 | 1/2006 | Stoev et al. | |
| 7,006,327 B2 | 2/2006 | Krounbi et al. | |
| 7,007,372 B1 | 3/2006 | Chen et al. | |
| 7,012,832 B1 | 3/2006 | Sin et al. | |
| 7,023,658 B1 | 4/2006 | Knapp et al. | |
| 7,026,063 B2 | 4/2006 | Ueno et al. | |
| 7,027,268 B1 | 4/2006 | Zhu et al. | |
| 7,027,274 B1 | 4/2006 | Sin et al. | |
| 7,110,289 B1 | 9/2006 | Sin et al. | |
| 7,111,382 B1 | 9/2006 | Knapp et al. | |
| 7,119,995 B2 | 10/2006 | Granstrom et al. | |
| 7,124,654 B1 | 10/2006 | Davies et al. | |
| 7,154,715 B2 | 12/2006 | Yamanaka et al. | |
| 7,199,975 B1 | 4/2007 | Pan | |
| 7,211,339 B1 | 5/2007 | Seagle et al. | |
| 7,212,384 B1 | 5/2007 | Stoev et al. | |
| 7,283,327 B1 | 10/2007 | Liu et al. | |
| 7,284,316 B1 | 10/2007 | Huai et al. | |
| 7,292,400 B2 | 11/2007 | Bishop | |
| 7,330,339 B2 | 2/2008 | Gill | |
| 7,333,295 B1 | 2/2008 | Medina et al. | |
| 7,337,530 B1 | 3/2008 | Stoev et al. | |
| 7,354,664 B1 | 4/2008 | Jiang et al. | |
| 7,417,832 B1 | 8/2008 | Erickson et al. | |
| 7,419,891 B1 | 9/2008 | Chen et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,639,457 B1 | 12/2009 | Chen et al. | |
| 7,660,080 B1 | 2/2010 | Liu et al. | |
| 7,672,080 B1 | 3/2010 | Tang et al. | |
| 7,719,795 B2 | 5/2010 | Hu et al. | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,785,666 B1 | 8/2010 | Sun et al. | |
| 7,796,356 B1 | 9/2010 | Fowler et al. | |
| 7,800,858 B1 | 9/2010 | Bajikar et al. | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,024,748 B1 | 9/2011 | Moravec et al. | |
| 8,065,788 B2 | 11/2011 | Guruz et al. | |
| 8,072,705 B1 | 12/2011 | Wang et al. | |
| 8,104,166 B1 | 1/2012 | Zhang et al. | |
| 8,151,441 B1 | 4/2012 | Rudy et al. | |
| 8,191,237 B1 | 6/2012 | Luo et al. | |
| 8,194,365 B1 | 6/2012 | Leng et al. | |
| 8,194,366 B1 | 6/2012 | Li et al. | |
| 8,196,285 B1 | 6/2012 | Zhang et al. | |
| 8,200,054 B1 | 6/2012 | Li et al. | |
| 8,220,140 B1 | 7/2012 | Wang et al. | |

(56) References Cited

U.S. PATENT DOCUMENTS

| | | |
|---|---|---|
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,307,539 B1 | 11/2012 | Rudy et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,400,731 B1 | 3/2013 | Li et al. |
| 8,491,801 B1 | 7/2013 | Tanner et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,533,937 B1 | 9/2013 | Wang et al. |
| 8,603,593 B1 | 12/2013 | Roy et al. |
| 8,611,054 B1 | 12/2013 | Shang et al. |
| 8,611,055 B1 | 12/2013 | Pakala et al. |
| 8,630,068 B1 | 1/2014 | Mauri et al. |
| 8,634,280 B1 | 1/2014 | Wang et al. |
| 8,643,980 B1 | 2/2014 | Fowler et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,703,397 B1 | 4/2014 | Zeng et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,818 B1 | 6/2014 | Diad et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,855,449 B1 | 10/2014 | Roth |
| 9,123,374 B1 | 9/2015 | Tohmon et al. |
| 2003/0002127 A1 | 1/2003 | George |
| 2003/0202746 A1* | 10/2003 | Hanashima .......... G02B 6/1228 385/45 |
| 2007/0165494 A1 | 7/2007 | Cho et al. |
| 2010/0002989 A1* | 1/2010 | Tokushima .......... G02B 6/1228 385/14 |
| 2010/0290157 A1 | 11/2010 | Zhang et al. |
| 2011/0069417 A1 | 3/2011 | Kawamori et al. |
| 2011/0086240 A1 | 4/2011 | Xiang et al. |
| 2011/0276287 A1 | 11/2011 | Iben et al. |
| 2012/0087045 A1 | 4/2012 | Yanagisawa et al. |
| 2012/0111826 A1 | 5/2012 | Chen et al. |
| 2012/0163750 A1* | 6/2012 | Chen .................... G02B 6/105 385/3 |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0327537 A1 | 12/2012 | Singleton et al. |
| 2013/0142474 A1 | 6/2013 | Dallesasse et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0112669 A1 | 4/2014 | Mizrahi et al. |
| 2014/0154529 A1 | 6/2014 | Yang et al. |
| 2014/0175050 A1 | 6/2014 | Zhang et al. |
| 2014/0321797 A1 | 10/2014 | Van Der Tol |
| 2015/0279394 A1* | 10/2015 | Peng ................... G11B 5/6088 385/28 |

OTHER PUBLICATIONS

J Yamauchi, N. Shibuya, and H. Nakano. "Polarization Coupling Between Strongly Guiding Waveguides Stacked Laterally," Journal of Lightwave Technology, vol. 27, No. 11, 2009.

M. Watts and H. Haus. "Integrated mode-evolution-based polarization rotators, Optics Letters," vol. 30, No. 2, 2005.

Non-Final Office Action issued on U.S. Appl. No. 14/752,482, dated Jun. 13, 2016.

Notice of Allowance on U.S. Appl. No. 14/752,482, dated Feb. 7, 2017.

Y. Ding, L. Liu, C. Peucheret, and H. Ou, "Fabrication tolerant polarization splitter and rotator based on a tapered directional coupler," Optics Express, vol. 20, No. 18, 2012.

* cited by examiner

FIG. 17

HEAT ASSISTED MAGNETIC RECORDING WRITER HAVING INTEGRATED POLARIZATION ROTATION WAVEGUIDES

CROSS-REFERENCE TO RELATED PATENT APPLICATIONS

This application is a continuation of U.S. patent application Ser. No. 14/752,482, filed on Jun. 26, 2015, the entirety of which is incorporated by reference herein.

BACKGROUND

A conventional heat assisted magnetic recording (HAMR) transducer typically includes at least a waveguide, a near-field transducer (NFT), a main pole and a coil for energizing the main pole. The conventional HAMR transducer uses light, or energy, received from a conventional laser in order to write to a magnetic recording media. Light from the laser is incident on and coupled into the waveguide. Light is guided by the conventional waveguide to the NFT near the ABS. The NFT focuses the light to magnetic recording media (not shown), such as a disk. This region is thus heated. The main pole is energized and field from the pole tip is used to write to the heated portion of the recording media.

Although the conventional HAMR transducer functions, improvements in performance are still desired.

DETAILED DESCRIPTION

Figure 1:
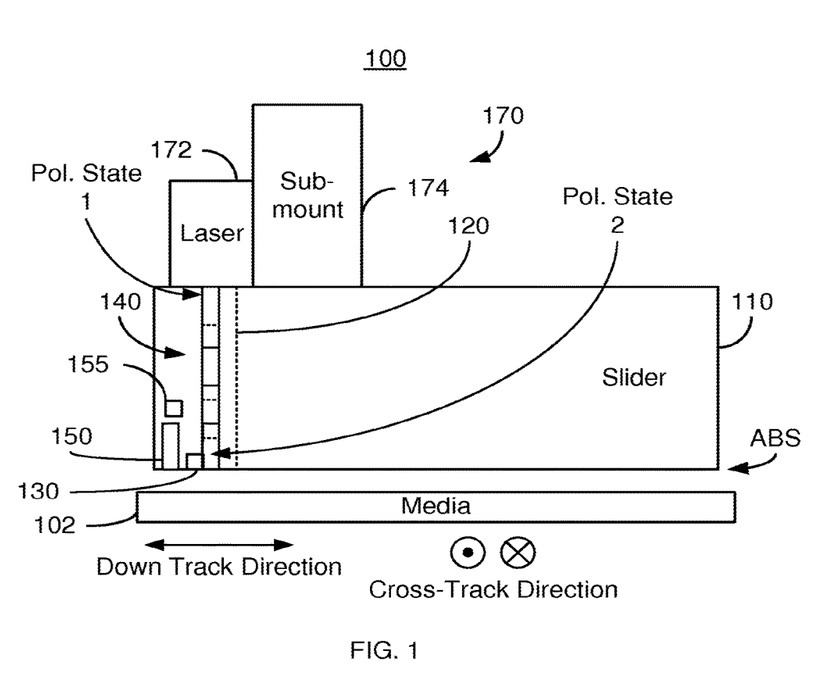
FIG. 1 is a diagram depicting a side view of an exemplary embodiment of a HAMR disk drive.

FIG. 1 depicts a side view of an exemplary embodiment of a portion of a heat-assisted magnetic recording (HAMR) write apparatus, or disk drive 100. For clarity, FIG. 1 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a HAMR transducer 120 and a laser subassembly 170. Additional and/or different components may be included in the HAMR disk drive 100. Although not shown, the slider 110, and thus the laser assembly 170 and HAMR transducer 120 are generally attached to a suspension. The laser assembly 170 includes a laser 172 and a submount 174. The submount 174 is a substrate to which the laser 172 may be affixed for improved mechanical stability, heat sinking, ease of manufacturing and better robustness. The laser 172 may be a chip such as a laser diode or other laser. The laser 172 outputs energy having a particular polarization state, indicated as Polarization State 1 (first polarization state) in FIG. 1. In some embodiments, this first polarization state is a TE mode. For example, the light may be linearly polarized in the cross-track direction. The laser 172 outputs this light energy through the surface closest to the HAMR transducer 120.

The HAMR transducer 120 is fabricated on the slider 110 and includes an air-bearing surface (ABS) proximate to the media 102 during use. In general, the HAMR write transducer 120 and a read transducer are present in the HAMR write apparatus 100. However, for clarity, only the HAMR write transducer 120 is shown. As can be seen in FIG. 1, HAMR transducer 120 includes a near-field transducer (NFT) 130, waveguides 140, a main pole 150 and coil(s) 155. The waveguides 140 are optically coupled with the laser 172. The waveguides 140 carry light energy from the laser 172 toward the ABS. The NFT 130 couples a portion of this energy from the waveguides 140 to the media 102. In some embodiments, the NFT 130 occupies a portion of the ABS. The NFT 130 transfers energy to the media 102. The write pole 150 is energized by the coils 155 and writes to the media 102. The coil(s) 155 may be solenoidal or spiral (pancake) coils. Other components including but not limited to other poles and/or shields may also be present.

In some embodiments, the NFT 130 may be configured to propagate a surface plasmon polariton. In such embodiments, the NFT 130 may be desired to utilize a transverse magnetic (TM) mode. This electric field of the mode may be oriented in the down track direction. In other embodiments, the NFT 130 may be configured to receive energy polarized in a particular manner for other reason(s). The desired polarization of light received by the NFT 130 is depicted as Polarization State 2 (second polarization) in FIG. 1. The Polarization State 2 is different from the Polarization State 1 emitted by the laser 172.

The waveguides 140 include an input waveguide that receives the light from the laser 172 and an output waveguide that may provide light to the NFT 130. The waveguides 140 are optically coupled. This may be achieved by overlapping the waveguides in regions where the waveguides are in close proximity. This overlap is shown in FIG. 1 by dashed lines. In the embodiment shown in FIG. 1, there are four waveguides 140. However, in another embodiment, another number of waveguides might be used. The waveguides 140 include at least the input waveguide and the output waveguide. The light energy received by the input waveguide closest to the laser 140 is polarized in the first state (Polarization State 1 in FIG. 1). In some embodiments, the first of the waveguide 140 may also be desired to be excited with linearly polarized light in a TE fashion with the electric field in the cross track direction. In other embodiments, the input waveguide may have improved efficiency for light polarized in another manner. However, the first polarization state of the light output by the laser 172 may be different than that which is desired, for example for use by the NFT 130.

Thus, the energy output by the laser 172 in the first polarization state may not match the energy desired to be input to the NFT 130 in the second polarization state. As a result, the waveguides 140 are optically coupled such that the polarization state of light traversing between the waveguides 140 is transferred from the first polarization state to the second polarization state.

For example, the NFT 130 may be configured for light that is linearly polarized in the down track direction (TM polarization), while the laser 172 outputs light polarized in the cross-track direction (TE polarization). Thus, the waveguides 140 are configured such that as energy from the laser 172 is transferred from one waveguide to another waveguide, the polarization state changes. Thus, the waveguides 140 change the polarization of the energy from the laser 172 to match the desired polarization state.

In operation, the laser 172 emits light having the first polarization state. The light then enters the input waveguide in the first polarization state. The input waveguide is optically coupled to the next waveguide, and so on until the output waveguide is reached. The polarization of light at the output of the output waveguide is the second polarization state. For example, the input waveguide may carry the TE polarized energy, while the output waveguide carries TM polarized light. Thus, while traversing the waveguides 140, particularly in the regions the waveguides 140 are optically coupled, the polarization of the light has been rotated from the first polarization state to the second polarization state. The waveguides 140 also direct the light to the NFT 130. Thus, light entering the NFT 130 has the desired second polarization state. The NFT 128 focuses the light to a region of magnetic recording media 102. High density bits can be written on a high coercivity medium with the pole 150 energized by the coils 155 to a modest magnetic field.

The HAMR disk drive 100 may exhibit enhanced performance. Using the waveguides 140, the polarization of the light energy from the laser 172 can be rotated to the desired direction. Thus, energy having the desired polarization can be provided to the NFT 130. For example, an NFT 130 that propagates surface plasmon polariton can be used in the HAMR transducer 100. In addition, a lower cost laser 172 that produces light linearly polarized in the cross-track direction may be used in the HAMR disk drive 100. Thus, performance of the HAMR disk drive may be improved.

Figure 2:
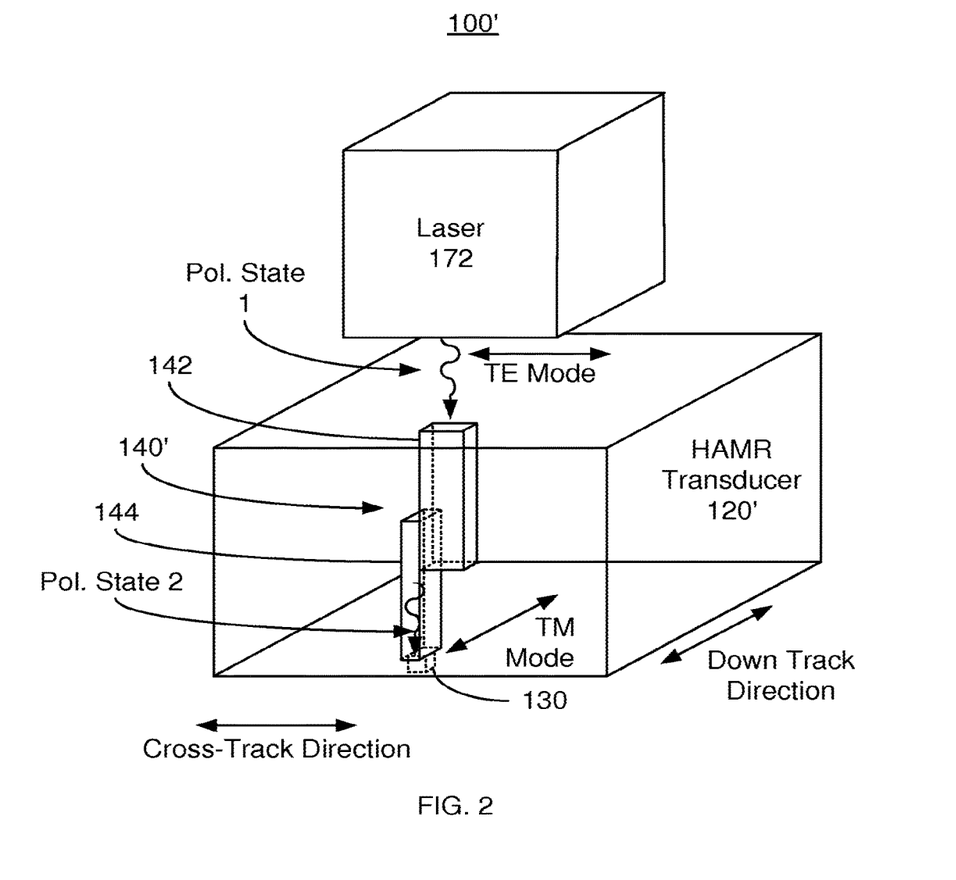
FIG. 2 is a diagram depicting an exploded perspective view of an exemplary embodiment of a portion of a HAMR writer.

FIG. 2 depicts an exploded perspective view of another exemplary embodiment of a portion of the HAMR disk drive 100'. For clarity, FIG. 2 is not to scale. For simplicity not all portions of the HAMR disk drive 100' are shown. In addition, although the HAMR disk drive 100' is depicted in the context of particular components other and/or different components may be used. Further, the arrangement of components may vary in different embodiments. The HAMR disk drive 100' is analogous to the HAMR disk drive 100. Consequently, similar components have analogous labels. The HAMR disk drive 100' thus includes a laser 172 and a HAMR transducer 120' that are analogous to the lasers 172 and HAMR transducer 120, respectively. The HAMR transducer 120' includes waveguides 140' and NFT 130 that are analogous to the waveguides 140 and NFT 130, respectively. For clarity, components such as the pole and coils have been omitted.

The waveguides 140' include an input waveguide 142 and an output waveguide 144. The input waveguide 142 is directly coupled with the output waveguide 144. As can be seen in FIG. 2, the laser 172 outputs light having a first polarization state, with the transverse electric (TE) mode in the cross track direction. Light energy polarized with the TE polarization enters the input waveguide 142. The waveguides 142 and 144 are coupled such that the light transmitted from the input waveguide 142 to the output waveguide 144 is the TM mode. Thus, light exiting the output waveguide 144 has the second polarization state, with the electric field oriented in the down track direction. The light is carried from the output waveguide 144 to the NFT 130. Because the polarization of the light is not further changed, the light energy coupled into the NFT 130 has the second polarization state. Stated differently, this light provided to the NFT 130 is polarized in the TM mode. The NFT 130 may then couple the energy from this light to the media (not shown in FIG. 2) and the write pole (not shown in FIG. 2) used to magnetically write to the heated portion of the media.

The HAMR disk drive 100' shares the benefits of the HAMR transducer 100. Using the input waveguide 142 and output waveguide 144, the polarization of the light energy from the laser 172 can be rotated to be in the desired direction. Thus, energy having the desired polarization can be provided to the NFT 130. Thus, performance of the HAMR disk drive 100' may be improved.

Figure 3A:
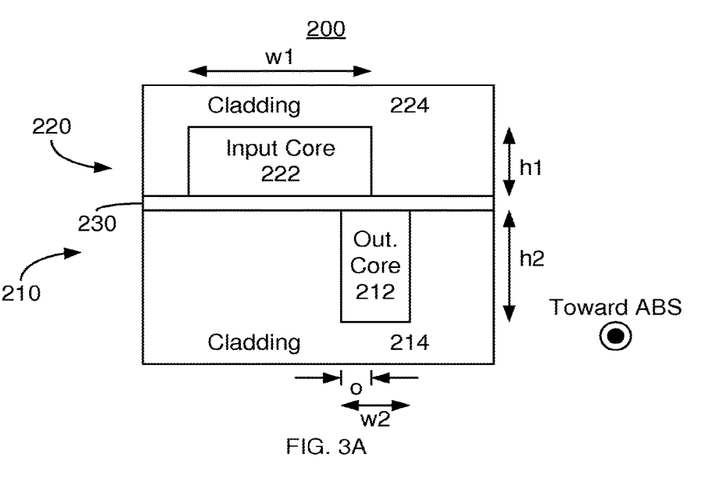
FIGS. 3A and 3B are diagrams depicting a cross-sectional and side views of another exemplary embodiment of a portion of a HAMR writer.
Figure 3B:
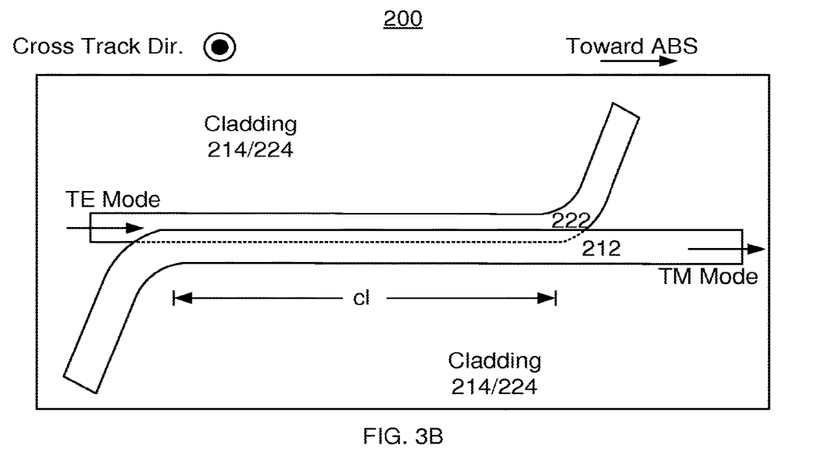

FIGS. 3A and 3B depict cross-sectional and side views of another exemplary embodiment of a portion of the HAMR write apparatus 200. For clarity, FIGS. 3A-3B are not to scale. For simplicity not all portions of the HAMR disk drive 200 are shown. In addition, although the HAMR write apparatus 200 is depicted in the context of particular components other and/or different components may be used. Further, the arrangement of components may vary in different embodiments. The HAMR write apparatus 200 is analogous to the HAMR disk drives 100 and 100'. The direction of transmission of light is out of the plane of the page in FIG. 3A (e.g. toward the ABS) and in the direction of the arrows labeled TE Mode and TM Mode in FIG. 3B.

The HAMR write apparatus includes a laser (not shown), an NFT (not shown), a write pole (not shown) for writing to the media, a coil and two waveguides 210 and 220. The waveguides 210 and 220 are analogous to the waveguides 140 and 140'. The waveguide 210 is the output waveguide in the embodiment shown, while the waveguide 220 is the input waveguide. The waveguide 210 includes a core 212 and cladding 214. The output waveguide 220 includes an input core 222 and cladding 224. The light carried by the waveguides 210 and 220 is primarily via the cores 212 and 222. The cores 212 and 222 have a different index of refraction than the cladding 214 and 224. For example, the cores 212 and 222 may be formed of tantalum oxide, while the cladding 214 and 224 may be formed of silicon oxide. In the embodiment depicted in FIGS. 3A-3B the waveguides 210 and 220 are separated by a layer 230. This layer 230 may be an etch stop layer used in fabricating the waveguides 210 and 220. For example, the layer 230 may be an aluminum oxide layer. In some embodiments, such a layer is nominally twenty nanometers thick. However, in other embodiments, the layer 230 may simply be a spacer layer.

The waveguides 210 and 220 are optically coupled and transfer the polarization from a TE mode to a TM mode. Thus, the aspect ratios of the cores differ. For example, the input core 222 has a height h1 and a width w1. The width is larger than the height for the input core 222 (w1>hh1). The output core 212 has a height h2 and w width w2. The height is larger than the width for the output core 212 (h2>w2). Thus, the aspect ratios differ. In particular, the long axes of the cores 212 and 222 are perpendicular to each other (w1 is perpendicular to h2). In the embodiment shown in FIGS. 3A-3B, the aspect ratios (height divided by width) for the waveguides 210 and 220 are not reciprocals (h1/w1.noteq.w2/h2). Thus, the widths and heights of the waveguides 210 and 220 differ. However, in other embodiments, the width of one waveguide 210 or 220 may match the height of the other waveguide 220 or 210, respectively. In general, the aspect ratios of the waveguides 210 and 220 may be optimized for the polarization of the light each waveguide 210 and 220, respectively, is desired to support.

In order to couple the waveguides 210 and 220, the waveguides 210 and 220 are directionally coupled along the coupling length, cl, depicted in FIG. 3B. In other embodiments, the waveguides 210 and 220 might be adiabatically coupled or coupled in another manner. In some embodiments, this length is on the order of eleven microns. The waveguides 210 and 220 are parallel along the coupling length such that light transmitted by the waveguides 210 and 220 have the same direction of transmission along the coupling length. In the embodiment shown in FIGS. 3A and 3B, outside of the coupling length, the waveguides 210 and 220 transmit light in other directions. Stated differently, outside of the coupling length, the waveguides 210 and 220 may have different directions of transmission, may not be in close proximity and are not optically coupled.

In addition, the cores 212 and 222 of the waveguides 210 and 220 are offset. As can be seen in FIGS. 3A-3B, the cores 212 and 222 are offset in the height direction by the spacer layer 230. The cores 212 and 222 are also offset in the width direction by the distance o. In the embodiment shown, the cores 212 and 222 overlap by the offset, o. In other embodiments, the cores 212 and 222 may be offset in the width direction such that they do not overlap and/or are spaced apart. Similarly, the cores 212 and 222 are shown as spaced apart in the height direction by the thickness of the layer 230. In other embodiments, the cores 212 and 222 may partially overlap, may not overlap, or may be spaced apart. In general, the cores 212 and 222 are desired to be offset by not more than their length and/or by not more than their width. In some embodiments, the cores 212 and 222 are offset by not more than one-half of their height and/or width.

In operation, the laser provides light having a first polarization state, with the TE mode with its electric field that may be in the cross track direction. The light having the TE mode polarization enters the input waveguide 220. In the coupling region, the light from the input waveguide 220 is transferred to the output waveguide 210 such that the polarization of the light transferred to the output waveguide 220 is changed to the TM mode. The output waveguide 210 may then transfer the light to the NFT or other component. Thus, this light provided to the NFT is polarized as desired (e.g. in the down track direction). The NFT may then couple the energy from this light to the media (not shown in FIGS. 3A-3B) and the write pole (not shown in FIGS. 3A-3B) used to write to the heated portion of the media.

The HAMR write apparatus 200 shares the benefits of the HAMR transducer(s) 100 and/or 100'. Using the input waveguide 220 and output waveguide 210, the polarization of the light energy from the laser can be transferred to be in the desired direction. Thus, energy having the desired polarization can be provided to the NFT (not shown in FIGS. 3A-3B). Thus, performance of the HAMR disk drive 200 may be improved.

Figure 4:
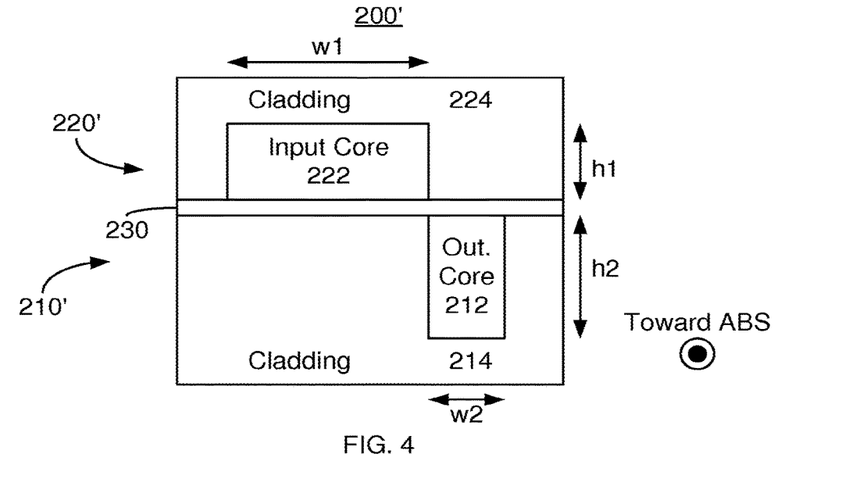
FIG. 4 is a diagram depicting a cross-sectional view of another exemplary embodiment of a HAMR writer.

FIG. 4 depicts a cross-sectional view of another exemplary embodiment of a portion of the HAMR write apparatus 200'. For clarity, FIG. 4 is not to scale. For simplicity not all portions of the HAMR disk drive 200' are shown. In addition, although the HAMR write apparatus 200' is depicted in the context of particular components other and/or different components may be used. Further, the arrangement of components may vary in different embodiments. The HAMR write apparatus 200' is analogous to the HAMR writers 100, 100' and/or 200. Thus, similar components have similar labels as in FIGS. 3A-3B. The direction of transmission of light is out of the plane of the page in FIG. 4 (e.g. toward the ABS).

The HAMR write apparatus includes a laser (not shown), an NFT (not shown), a write pole (not shown) for writing to the media, a coil and two waveguides 210' and 220'. The waveguides 210' and 220' are analogous to the waveguides 210 and 220, respectively, as well as the waveguides 140 and 140'. The waveguide 210' is the output waveguide in the embodiment shown, while the waveguide 220' is the input waveguide. The waveguide 210' includes a core 212 and cladding 214. The output waveguide 220' includes an input core 222 and cladding 224. In the embodiment depicted in FIG. 4 the waveguides 210' and 220' are separated by a layer 230, which is analogous to the layer 230 depicted in FIG. 3A.

The waveguides 210' and 220' are optically coupled and transfer the polarization from TE to TM. Thus, the aspect ratios of the cores differ in a manner analogous to that described above. The input core 222 has a height h1 and a width w1. The width is larger than the height for the input core 222 (w1>h1). The output core 212 has a height h2 and w width w2. The height is larger than the width for the output core 212 (h2>w2). Thus, the aspect ratios differ. In the embodiment shown, the long axes of the cores 212 and 222 are perpendicular to each other (w1 is perpendicular to h2).

The waveguides 210' and 220' may be adiabatically coupled, directionally coupled or coupled in another manner. In addition, the cores 212 and 222 of the waveguides 210' and 220' are offset. As can be seen in FIG. 4, the cores 212 and 222 are offset in the width direction such that the right edge of the input waveguide core 222 is aligned with the left edge of the output waveguide core 212. The cores 212 and 222 are offset by the spacer layer 230 in the height direction. In other embodiments, the spacer layer 230 might be omitted. In some such embodiments, the top of the output core 212 may be aligned with the bottom of the input core 222. In such an embodiment, the edges of the cores 212 and 222 (depicted as corners in FIG. 4) may just touch. Different offsets in the height and/or width directions are possible.

The HAMR write apparatus 200' shares the benefits of the HAMR transducer(s) 100, 100' and/or 200. Using the input waveguide 220' and output waveguide 210', the polarization of the light energy from the laser can be transferred to be in the desired direction. Thus, energy having the desired polarization can be provided to the NFT (not shown in FIG. 4). Thus, performance of the HAMR disk drive 200' may be improved.

Figure 5:
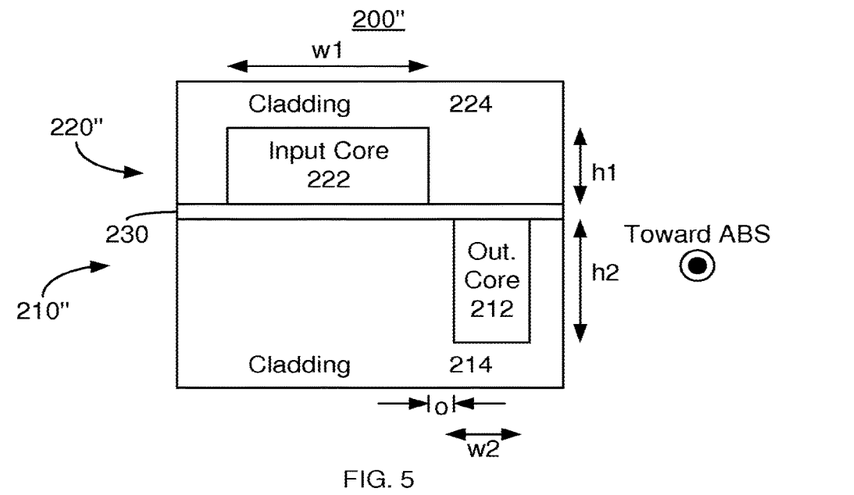
FIG. 5 is a diagram depicting a cross-sectional view of another exemplary embodiment of a HAMR writer.

FIG. 5 depicts a cross-sectional view of another exemplary embodiment of a portion of the HAMR write apparatus 200". For clarity, FIG. 5 is not to scale. For simplicity not all portions of the HAMR disk drive 200" are shown. In addition, although the HAMR write apparatus 200" is depicted in the context of particular components other and/or different components may be used. Further, the arrangement of components may vary in different embodiments. The HAMR write apparatus 200" is analogous to the HAMR writers 100, 100', 200 and/or 200'. Thus, similar components have similar labels as in FIGS. 3A-4. The direction of transmission of light is out of the plane of the page in FIG. 5 (e.g. toward the ABS).

The HAMR write apparatus includes a laser (not shown), an NFT (not shown), a write pole (not shown) for writing to the media, a coil and two waveguides 210" and 220". The waveguides 210" and 220" are analogous to the waveguides 210/210' and 220/220', respectively, as well as the waveguides 140 and 140'. The waveguide 210" is the output waveguide in the embodiment shown, while the waveguide 220" is the input waveguide. The waveguide 210" includes a core 212 and cladding 214. The output waveguide 220" includes an input core 222 and cladding 224. In the embodiment depicted in FIG. 5 the waveguides 210" and 220" are separated by a layer 230, which is analogous to the layer 230 depicted in FIG. 3A.

The waveguides 210" and 220" are optically coupled and transfer the polarization from TE to TM. Thus, the aspect ratios of the cores differ in a manner analogous to that described above. The input core 222 has a height h1 and a width w1. The width is larger than the height for the input core 222 (w1>hh1). The output core 212 has a height h2 and w width w2. The height is larger than the width for the output core 212 (h2>w2). Thus, the aspect ratios differ. In the embodiment shown, the long axes of the cores 212 and 222 are perpendicular to each other (w1 is perpendicular to h2).

The waveguides 210" and 220" may be adiabatically coupled, directionally coupled or coupled in another manner. In addition, the cores 212 and 222 of the waveguides 210" and 220" are offset. As can be seen in FIG. 5, the cores 212 and 222 are offset in the width and height directions such that there is space between the waveguides 210" and 220" in both directions. Different offsets in the height and/or width directions are possible.

The HAMR write apparatus 200" shares the benefits of the HAMR transducer(s) 100, 100', 200 and/or 200'. Using the input waveguide 220" and output waveguide 210", the polarization of the light energy from the laser can be transferred to be in the desired direction. Thus, energy having the desired polarization can be provided to the NFT (not shown in FIG. 5). Thus, performance of the HAMR disk drive 200" may be improved.

Figure 6:
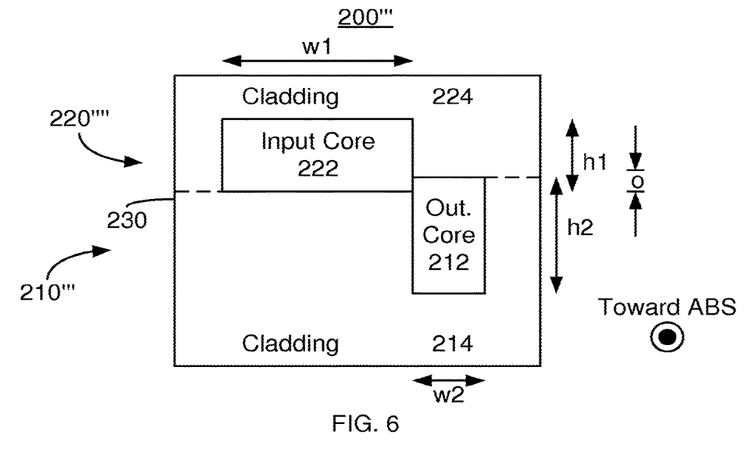
FIG. 6 is a diagram depicting a cross-sectional view of another exemplary embodiment of a HAMR writer.

FIG. 6 depicts a cross-sectional view of another exemplary embodiment of a portion of the HAMR write apparatus 200'''. For clarity, FIG. 6 is not to scale. For simplicity not all portions of the HAMR disk drive 200''' are shown. In addition, although the HAMR write apparatus 200''' is depicted in the context of particular components other and/or different components may be used. Further, the arrangement of components may vary in different embodiments. The HAMR write apparatus 200''' is analogous to the HAMR writers 100, 100', 200, 200' and/or 200". Thus, similar components have similar labels as in FIGS. 3A-5. The direction of transmission of light is out of the plane of the page in FIG. 6 (e.g. toward the ABS).

The HAMR write apparatus includes a laser (not shown), an NFT (not shown), a write pole (not shown) for writing to the media, a coil and two waveguides 210''' and 220'''. The waveguides 210''' and 220''' are analogous to the waveguides 210/210'/210" and 220/220'/220", respectively, as well as the waveguides 140 and 140'. The waveguide 210''' is the output waveguide in the embodiment shown, while the waveguide 220''' is the input waveguide. The waveguide 210''' includes a core 212 and cladding 214. The output waveguide 220'''' includes an input core 222 and cladding 224. In the embodiment depicted in FIG. 6 the layer 230 depicted in FIGS. 3A-5 is omitted.

The waveguides 210''' and 220''' are optically coupled and transfer the polarization from TE to TM. Thus, the aspect ratios of the cores differ in a manner analogous to that described above. The input core 222 has a height h1 and a width w1. The width is larger than the height for the input core 222 (w1>hh1). The output core 212 has a height h2 and w width w2. The height is larger than the width for the output core 212 (h2>w2). Thus, the aspect ratios differ. In the embodiment shown, the long axes of the cores 212 and 222 are perpendicular to each other (w1 is perpendicular to h2).

The waveguides 210''' and 220''' may be adiabatically coupled, directionally coupled or coupled in another manner. In addition, the cores 212 and 222 of the waveguides 210''' and 220''' are offset. As can be seen in FIG. 6, the cores 212 and 222 are offset in the width and height directions such that the cores 212 and 222 overlap by a distance o in the height direction and have their edges aligned in the width direction. In addition, the spacer layer 230 has been omitted. Different offsets in the height and/or width directions are possible.

The HAMR write apparatus 200''' shares the benefits of the HAMR transducer(s) 100, 100', 200, 200' and/or 200". Using the input waveguide 220'''' and output waveguide 210''', the polarization of the light energy from the laser can be transferred to be in the desired direction. Thus, energy having the desired polarization can be provided to the NFT (not shown in FIG. 6). Thus, performance of the HAMR disk drive 200''' may be improved.

Figure 7:
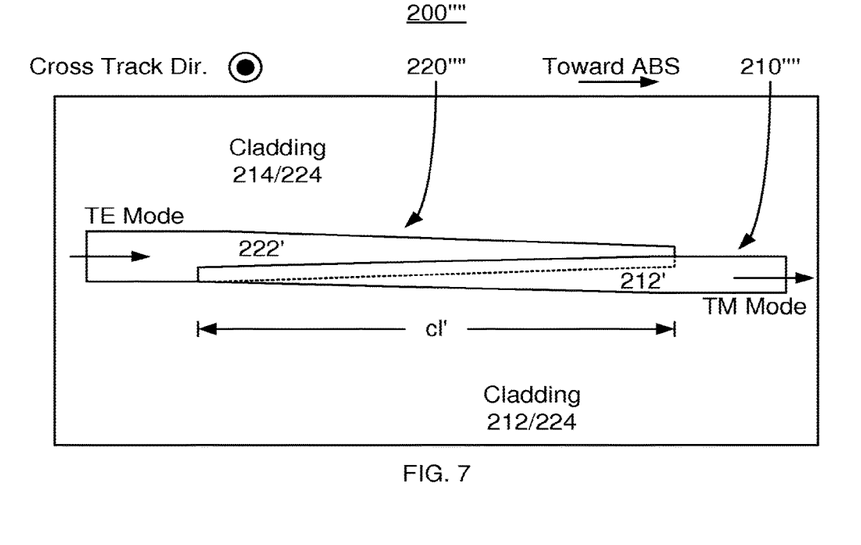
FIG. 7 is a diagram depicting a side view of another exemplary embodiment of a HAMR writer.

FIG. 7 depicts a side view of another exemplary embodiment of a portion of the HAMR write apparatus 200''''. For clarity, FIG. 7 is not to scale. For simplicity not all portions of the HAMR disk drive 200'''' are shown. In addition, although the HAMR write apparatus 200'''' is depicted in the context of particular components other and/or different components may be used. Further, the arrangement of components may vary in different embodiments. The HAMR write apparatus 200'''' is analogous to the HAMR writers 100, 100', 200, 200', 200" and/or 200'''. Thus, similar components have similar labels as in FIGS. 3A-6. The direction of transmission of light is in the direction of the TE Mode and TM Mode arrows in FIG. 7.

The HAMR write apparatus includes a laser (not shown), an NFT (not shown), a write pole (not shown) for writing to the media, a coil and two waveguides 210'''' and 220''''. The waveguides 210'''' and 220'''' are analogous to the waveguides 210/210'/210"/210''' and 220/220'/220"/220''', respectively, as well as the waveguides 140 and 140'. The waveguide 210'''' is the output waveguide in the embodiment shown, while the waveguide 220'''' is the input waveguide. The waveguide 210'''' includes a core 212' and cladding 214. The output waveguide 220'''' includes an input core 222' and cladding 224. In the embodiment depicted in FIG. 7 the layer 230 depicted in FIGS. 3A-5 is not shown. The layer 230 might be omitted or might be included.

The waveguides 210" and 220'''' are optically coupled and transfer the polarization from TE to TM. Thus, the aspect ratios of the cores differ in a manner analogous to that described above. The waveguides 210''' and 220''' are adiabatically coupled in the embodiment shown in FIG. 7. Thus, the core 222' of the input waveguide 220'''' terminates after the coupling region having length cl'. Similarly, the output waveguide 210'''' starts just before the coupling region. In the embodiment shown, the waveguides 210'''' and 220'''' taper near the ends shown. However, in other embodiments, the waveguides 210'''' and/or 220'''' may terminate in another manner.

The HAMR write apparatus 200'''' shares the benefits of the HAMR transducer(s) 100, 100', 200, 200', 200'' and/or 200'''. Using the input waveguide 220'''' and output waveguide 210'''', the polarization of the light energy from the laser can be transferred to be in the desired direction. Further, use of adiabatic coupling allows reduces the need for phase matching between the waveguides 210'''' and 220''''. In addition, the waveguides 210'''' and 220'''' may be easier to fabricate because tolerances for the waveguides 210''' and 220'''' may be relaxed. Thus, energy having the desired polarization can be provided to the NFT (not shown in FIG. 7). Thus, performance of the HAMR disk drive 200'''' may be improved.

Figure 8:
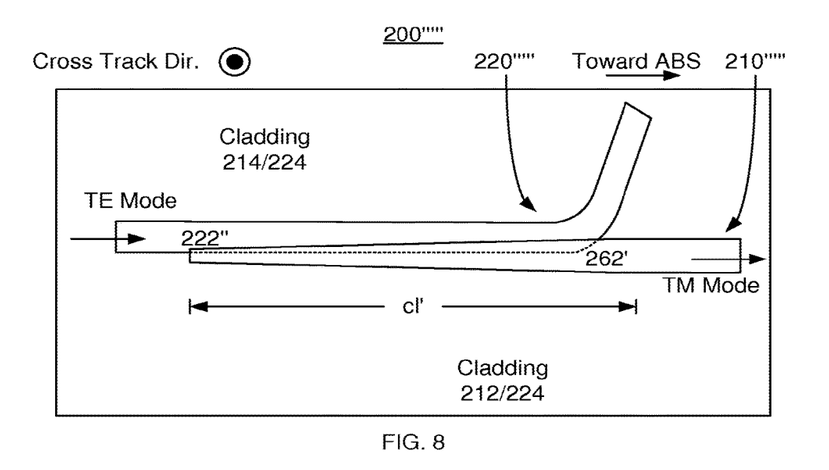
FIG. 8 is a diagram depicting a side view of another exemplary embodiment of a HAMR writer.

FIG. 8 depicts a side view of another exemplary embodiment of a portion of the HAMR write apparatus 200'''''. For clarity, FIG. 8 is not to scale. For simplicity not all portions of the HAMR disk drive 200''''' are shown. In addition, although the HAMR write apparatus 200''''' is depicted in the context of particular components other and/or different components may be used. Further, the arrangement of components may vary in different embodiments. The HAMR write apparatus 200''''' is analogous to the HAMR writers 100, 100', 200, 200', 200'', 200''' and/or 200''''. Thus, similar components have similar labels as in FIGS. 3A-7. The direction of transmission of light is in the direction of the TE Mode and TM Mode arrows in FIG. 8.

The HAMR write apparatus includes a laser (not shown), an NFT (not shown), a write pole (not shown) for writing to the media, a coil and two waveguides 210''''' and 220'''''. The waveguides 210''''' and 220''''' are analogous to the waveguides 210/210'/210''/210'''/210'''' and 220/220'/220''/220'''/220'''', respectively, as well as the waveguides 140 and 140'. The waveguide 210''''' is the output waveguide in the embodiment shown, while the waveguide 220''''' is the input waveguide. The waveguide 210''''' includes a core 212'' and cladding 214. The output waveguide 220''''' includes an input core 222'' and cladding 224. In the embodiment depicted in FIG. 8 the layer 230 depicted in FIGS. 3A-5 is not shown. The layer 230 might be omitted or might be included.

The waveguides 210''''' and 220''''' are optically coupled and transfer the polarization from TE to TM. Thus, the aspect ratios of the cores differ in a manner analogous to that described above. The core 222'' of the input waveguide 220''''' does not terminates after the coupling region having length cl'. However, the output waveguide 210''''' starts just before the coupling region. In an alternate embodiment, the input waveguide 220''''' might terminate after the coupling region while the output waveguide 210''''' does not. Thus, the embodiment shown in FIG. 8 may be considered a combination of the transducer 200 and 200''''. In the embodiment shown, the waveguide 220''''' tapers near the end shown. However, in other embodiments, the waveguide 220''''' may terminate in another manner.

The HAMR write apparatus 200''''' shares the benefits of the HAMR transducer(s) 100, 100', 200, 200', 200'', 200''' and/or 200''''. Using the input waveguide 220''''' and output waveguide 210''''', the polarization of the light energy from the laser can be transferred to be in the desired direction. Thus, energy having the desired polarization can be provided to the NFT (not shown in FIG. 8). Thus, performance of the HAMR disk drive 200''''' may be improved.

It is noted that various configurations of waveguides 140, 140', 210/220, 210'/220', 210''/220'', 210'''/220''', 210''''/220'''' and 210'''''/220''''' are highlighted in FIGS. 3A-8. However, various characteristics of the waveguides 140, 140', 210/220, 210'/220', 210''/220'', 210'''/220''', 210''''/220'''' and/or 210'''''/220''''' may be combined in a manner not inconsistent with the discussion herein.

Figure 9:
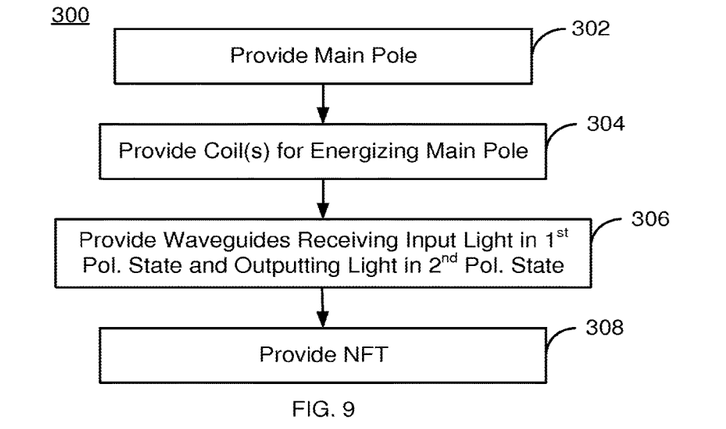
FIG. 9 is a flow chart depicting an exemplary embodiment of a method for fabricating a HAMR write apparatus.

FIG. 9 is a flow chart depicting an exemplary embodiment of a method 300 for fabricating a HAMR write apparatus. The method 300 may be used in fabricating disk drives such as the disk drives 100, 100', 200, 200', 200'', 200''', 200'''' and/or 200''''', though other transducers might be so fabricated. For clarity, the method 300 is described in the context of the writers 100 and 100' depicted in FIGS. 1 and 2. For simplicity, some steps may be omitted, performed in another order, interleaved and/or combined. The HAMR writers being fabricated may include a writer and a read transducer (not shown) and resides on a slider. For simplicity, however, the reader is not discussed. The method 300 is also described in the context of forming a transducer. However, the method 300 may be used to fabricate multiple transducer(s) at substantially the same time. The method 300 and system are also described in the context of particular layers. However, in some embodiments, such layers may include multiple sub-layers. The method 300 also may commence after formation of other portions of the disk drive.

A main pole 150 is provided. Step 150 may include multiple substeps such as forming a trench for the main pole in a layer, plating the high saturation magnetization material (s) for the main pole and planarizing these materials.

At least one coil 155 for energizing the main pole is provided, via step 304. Step 304 generally includes multiple deposition and removal steps to form the coil. The coil 155 may be a spiral coil, a toroidal coil or have another shape.

The waveguides 140/140' are also provided, via step 306. The waveguides 140/140' include an input waveguide such as the waveguide 142 and an output waveguide 144. The waveguides 140/140' provided in step 306 receive energy from the laser 172 and for direct the energy toward the ABS. The waveguides 140/140' are optically coupled and configured to transfer the polarization of the energy from the input polarization state to the output polarization state. For example, the waveguides may be configured to transfer the energy from a TE mode to a TM mode.

Using the method 300, the HAMR devices 100, 100', 200, 200', 200'', 200''', 200'''' and/or 200''''' may be fabricated. The benefit(s) of one or more of the HAMR writer(s) 100, 100', 200, 200', 200'', 200''', 200'''' and/or 200''''' may thus be achieved.

Figure 10:
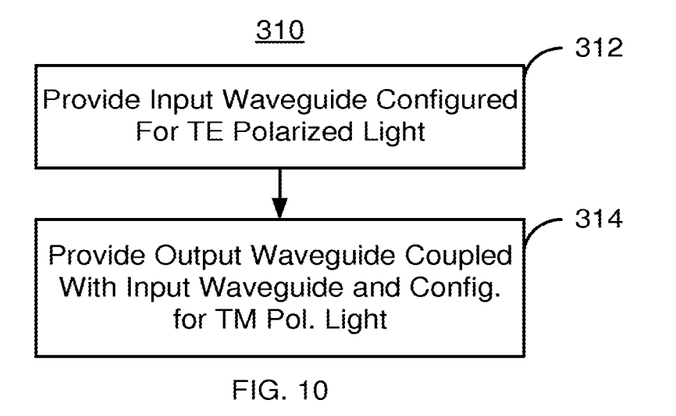
FIG. 10 is a flow chart depicting an exemplary embodiment of a method for fabricating waveguides for a HAMR write apparatus.

FIG. 10 is a flow chart depicting an exemplary embodiment of a method 310 for fabricating a portion of a HAMR writer. For example, the method 310 may primarily be used in forming the waveguides 140, 140', 210/220, 210'/220', 210''/220'', 210'''/220''', 210''''/220'''' and/or 210'''''/220'''''. However, other waveguides might be fabricated. For clarity, the method 310 is described in the context of the writer 100' depicted in FIG. 2. For simplicity, some steps may be omitted, performed in another order, interleaved and/or combined. The HAMR writers being fabricated may include a writer and a read transducer (not shown) and resides on a slider. For simplicity, however, the reader is not discussed. The method 310 is also described in the context of forming a transducer. However, the method 310 may be used to fabricate multiple transducer(s) at substantially the same time. The method 310 and system are also described in the context of particular layers. However, in some embodiments, such layers may include multiple sub-layers. The method 310 also may commence after formation of other portions of the disk drive.

The input waveguide 142 configured for TE light is provided, via step 312. Step 312 typically includes forming a core having the appropriate geometry and substantially surrounding the core with cladding.

The output waveguide 144 is provided, via step 314. The output waveguide configured such that it is optically coupled with the input waveguide 142 and so that the light carried by the output waveguide 144 has a TM polarization.

Using the method 310, the waveguides for the HAMR devices 100, 100', 200, 200', 200'', 200''', 200'''' and/or 200''''' may be fabricated. The benefit(s) of one or more of the HAMR writer(s) 100, 100', 200, 200', 200'', 200''', 200'''' and/or 200''''' may thus be achieved.

Figure 11:
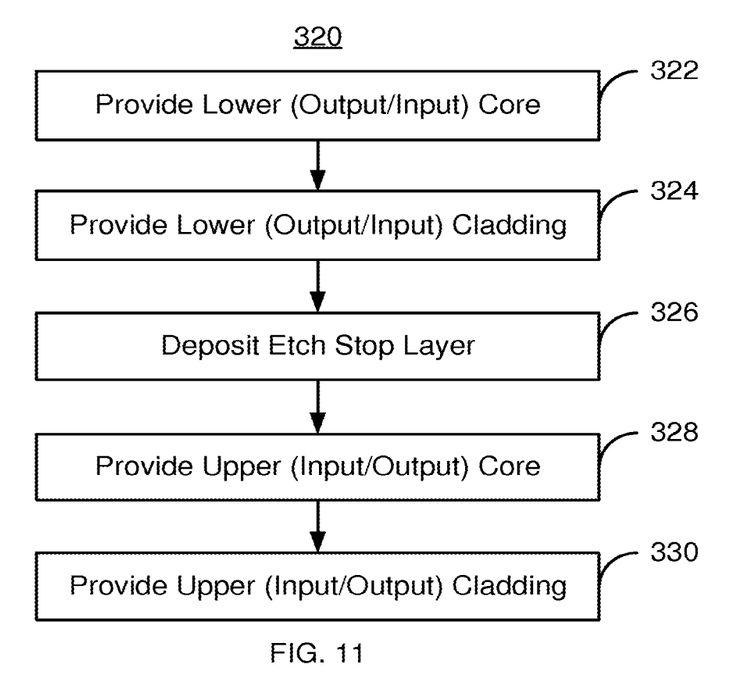
FIG. 11 is a flow chart depicting an exemplary embodiment of a method for fabricating waveguides for a HAMR write apparatus.

FIG. 11 is a flow chart depicting an exemplary embodiment of a method 320 for fabricating a portion of a HAMR writer. For example, the method 320 may primarily be used in forming the waveguides 140, 140', 210/220, 210'/220', 210''/220'', 210'''/220''', 210''''/220'''' and/or 210'''''/220'''''. However, other waveguides might be fabricated. FIGS. 12-17 depict a portion of a HAMR write apparatus 350 during fabrication of the waveguides using the method 320. FIGS. 12-17 are not to scale and not all components of the writer 350 are shown. For simplicity, some steps may be omitted, performed in another order, interleaved and/or combined. The HAMR writers being fabricated may include a writer and a read transducer (not shown) and resides on a slider. However, the reader is not discussed. The method 320 is also described in the context of forming a single transducer. However, the method 320 may be used to fabricate multiple transducer(s) at substantially the same time. The method 320 and system are also described in the context of particular layers. However, in some embodiments, such layers may include multiple sub-layers. The method 320 also may commence after formation of other portions of the disk drive.

Figure 12:
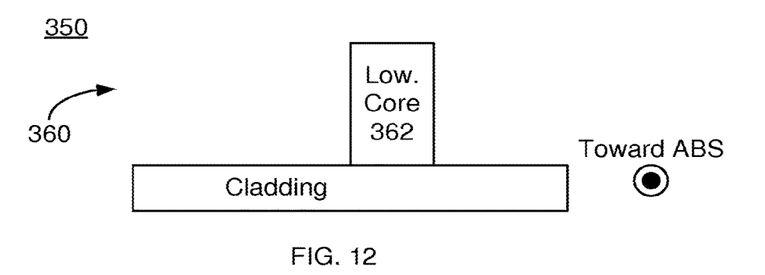
FIGS. 12-17 depict cross-sectional views of an exemplary embodiment of a wafer during fabrication of waveguides for the HAMR disk drive.

The core of the lower waveguide (closer to the underlying substrate) is provided, via step 322. Step 322 may include depositing a material having the desired index of refraction, such as tantalum oxide. The regions desired to form the core are then covered in a mask and the exposed regions removed. FIG. 12 depicts a cross-sectional view of the writer 350 after step 322 is performed. Thus, the core 362 of the lower waveguide 360 is formed on the underlying cladding. Note that this lower waveguide 360 could be the input waveguide, the output waveguide or another waveguide (if any) between the input and output waveguides.

Figure 13:
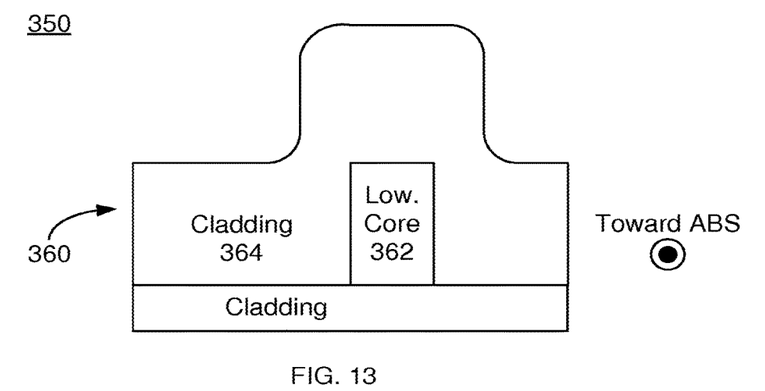
Figure 14:
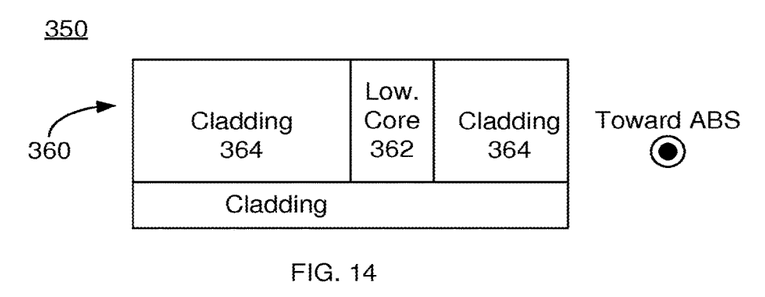

A layer of cladding for the lower waveguide is provided, via step 324. Step 324 may include blanket depositing a cladding material, such as silicon oxide, then planarizing the material. FIGS. 13-14 depict the writer 350 during and after step 324. The cladding layer 364 is shown as being deposited in FIG. 13. Thus, the cladding 364 covers the lower core 362. FIG. 14 depicts the transducer 350 after the device has been planarized. Thus, the top surfaces of the core 362 and cladding 364 are substantially flat.

Figure 15:
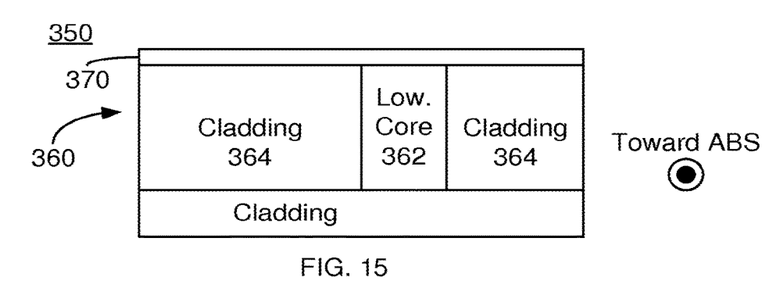

An etch stop layer is optionally deposited, via step 326. The etch stop layer is resistant to removal by an etch that removes the upper core and/or upper cladding. For example, an aluminum oxide layer that is nominally twenty nanometers thick may be provided in step 326. FIG. 15 depicts the writer 350 after step 326 is performed. Thus, the stop layer 370 is shown. In other embodiments, step 326, and thus the etch stop layer 370, may be omitted.

Figure 16:
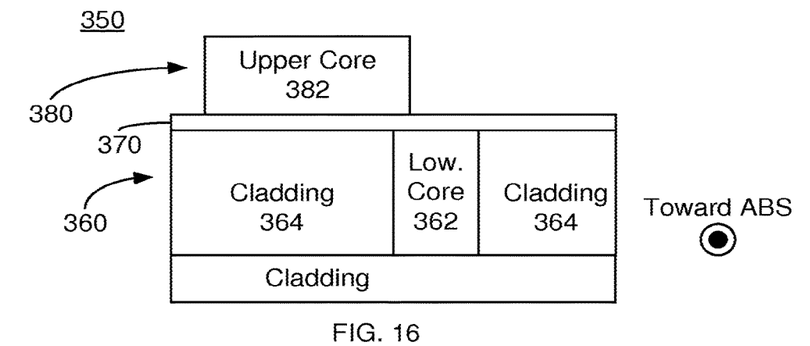
Figure 17:
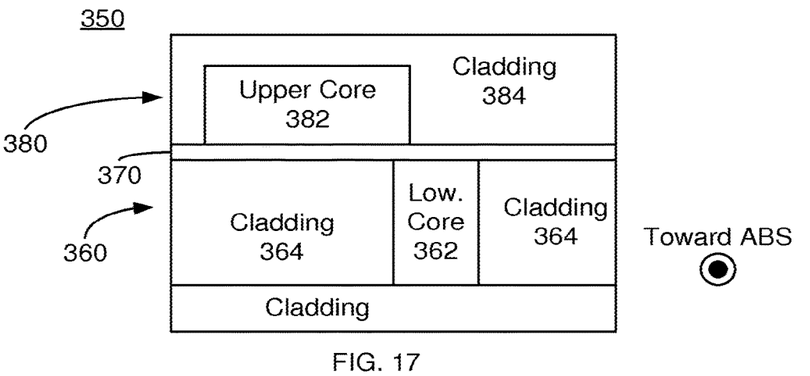

The core of the upper waveguide (further from the underlying substrate) is provided, via step 328. Step 328 may include depositing a material having the desired index of refraction, such as tantalum oxide. The regions desired to form the core are then covered in a mask and the exposed regions removed. The etch stop layer 370 may prevent damage to the underlying core 362 during formation of the core. FIG. 16 depicts a cross-sectional view of the writer 350 after step 326 is performed. Thus, the core 382 of the upper waveguide 380 is formed on the cladding 364 and core 362. Note that this upper waveguide 380 could be the input waveguide, the output waveguide or another waveguide (if any) between the input and output waveguides. In addition, particular offsets between the lower core 362 and upper core 382 are shown in FIGS. 16-17. In other embodiments, different offsets may be used.

A layer of cladding for the upper waveguide 380 is provided, via step 330. Step 330 may include blanket depositing a cladding material, such as silicon oxide, then planarizing the material. FIG. 17 depict the writer 350 after step 330. The cladding layer 384 for the upper waveguide 380 is shown. Thus, the cladding 384 covers the upper core 382 and etch stop layer 370.

Using the method 320, the HAMR writer 350 may be fabricated. The writer 350 is analogous to the writers 100, 100', 200, 200', 200'', 200''', 200'''', and/or 200'''''. Performance and/or reliability of the disk drive 350 may thus be improved in a manner analogous to the HAMR disk drives 100, 100', 200, 200', 200'', 200''', 200'''' and/or 200'''''.

What is claimed is:

1. A heat assisted magnetic recording write apparatus, the apparatus comprising:
    an input waveguide comprising an input core, wherein the input core receives light energy from a laser in a first polarization state, wherein the input core includes a first wall extending along a width direction, and a second wall extending along a height direction, and wherein the first wall is greater in dimension than the second wall, wherein the width direction is transverse to a direction of propagation of the received light energy and the height direction is perpendicular to the width direction; and
    an output waveguide comprising an output core, wherein the output core is optically coupled to the input core to receive the light energy in the first polarization state and convert the light energy into a second polarization state that is different from the first polarization state, and wherein the output core is offset from the input core,
    wherein the input core includes a first input sidewall and a second input sidewall extending along a height direction, and the output core includes a first output sidewall and a second output sidewall extending along the height direction, wherein the first input sidewall is closer to an air bearing surface than the second input sidewall, and the first output sidewall is closer to the air bearing surface than the second output sidewall, and wherein a portion of the second output sidewall overlaps with a portion of the first input sidewall in the height direction.

2. The apparatus of claim 1, wherein, in the first polarization state, the light energy is polarized in a cross-track direction.

3. The apparatus of claim 1, wherein, in the second polarization state, the light energy is polarized in a down-track direction.

4. The apparatus of claim 1, wherein an aspect ratio of the input core is different from an aspect ratio of the output core.

5. The apparatus of claim 1, wherein the output core includes a first wall extending along a width direction, and a second wall extending along a height direction, and wherein the second wall is greater in dimension than the first wall.

6. The apparatus of claim 1, wherein the input core and the output core are optically coupled along a coupling length such that the input waveguide and the output waveguide are parallel along the coupling length, and wherein the light energy is transmitted in a same direction by the input core and the output core along the coupling length.

7. The apparatus of claim 1, further comprising a spacer layer positioned between the input core and the output core.

8. The apparatus of claim 1, wherein the input core includes an input bottom wall extending along a width direction and the output core includes an output top wall extending along the width direction, and wherein a portion of the input bottom wall overlaps a portion of the output top wall in the width direction.

9. The apparatus of claim 1, wherein the input core includes an input bottom wall extending along a width direction and the output core includes an output top wall extending along the width direction, and wherein the input bottom wall is offset from the output top wall in the width direction.

10. The apparatus of claim 1, further comprising an input cladding surrounding the input core and an output cladding surrounding the output core.

11. A heat assisted magnetic recording write apparatus, the apparatus comprising:
an input waveguide comprising an input core, wherein the input core receives light energy from a laser in a first polarization state, wherein the input core includes a first wall extending along a width direction, and a second wall extending along a height direction, and wherein the first wall is greater in dimension than the second wall, wherein the width direction is transverse to a direction of propagation of the received light energy and the height direction is perpendicular to the width direction; and
an output waveguide comprising an output core, wherein the output core is optically coupled to the input core to receive the light energy in the first polarization state and convert the light energy into a second polarization state that is different from the first polarization state, and wherein the output core is offset from the input core, wherein the input core includes a first input sidewall and a second input sidewall extending along a height direction, and the output core includes a first output sidewall and a second output sidewall extending along the height direction, wherein the first input sidewall is closer to an air bearing surface than the second input sidewall, and the first output sidewall is closer to the air bearing surface than the second output sidewall, and wherein the second output sidewall is in alignment with and spaced apart from the first input sidewall.

12. A heat assisted magnetic recording write apparatus, the apparatus comprising:
an input waveguide comprising:
an input core having a first input wall extending along a width direction and a second input wall extending in a height direction, and wherein the first input wall is greater in dimension than the second input wall; and
an input cladding surrounding the input core, wherein the input core receives light energy from a laser in a first polarization state; and
an output waveguide comprising:
an output core having a first output wall extending along the width direction, and a second output wall extending along the height direction, and wherein the second output wall is greater in dimension than the first output wall; and
an output cladding surrounding the output core,
wherein the output core is optically coupled to the input core to receive the light energy in the first polarization state and convert the light energy into a second polarization state that is different from the first polarization state.

13. The apparatus of claim 12, further comprising a near-field transducer that receives the light energy in the second polarization state from the output waveguide and focusses the light energy onto a magnetic recording media.

14. The apparatus of claim 12, wherein a direction of the first polarization state is perpendicular to a direction of the second polarization state.

15. A method, comprising:
focusing light energy in a first polarization state emitted from a laser into an input core of an input waveguide, wherein the input core includes a first wall extending along a width direction, and a second wall extending along a height direction, and wherein the first wall is greater in dimension than the second wall, wherein the width direction is transverse to a direction of propagation of the received light energy and the height direction is perpendicular to the width direction;
transmitting the light energy from the input core to an output core of an output waveguide, wherein the output core is optically coupled to the input core;
converting the light energy from the first polarization state into a second polarization state by the output core, wherein the second polarization state is different from the first polarization state; and
directing the light energy in the second polarization state from the output waveguide to a near-field transducer;
wherein the input core includes a first input sidewall and a second input sidewall extending along a height direction, and the output core includes a first output sidewall and a second output sidewall extending along the height direction, wherein the first input sidewall is closer to an air bearing surface than the second input sidewall, and the first output sidewall is closer to the air bearing surface than the second output sidewall, and wherein a portion of the second output sidewall overlaps with a portion of the first input sidewall in the height direction.

16. The method of claim 15, further comprising focusing the light energy by the near-field transducer to a portion of a magnetic recording media for writing.

* * * * *